Jan. 25, 1966  A. A. LIICK  3,230,809
COOPERATING ROTARY CUTTER BLADES WITH MEANS TO ADJUST
ANGULAR TRAVERSE POSITION OF BLADES
Filed Nov. 13, 1963
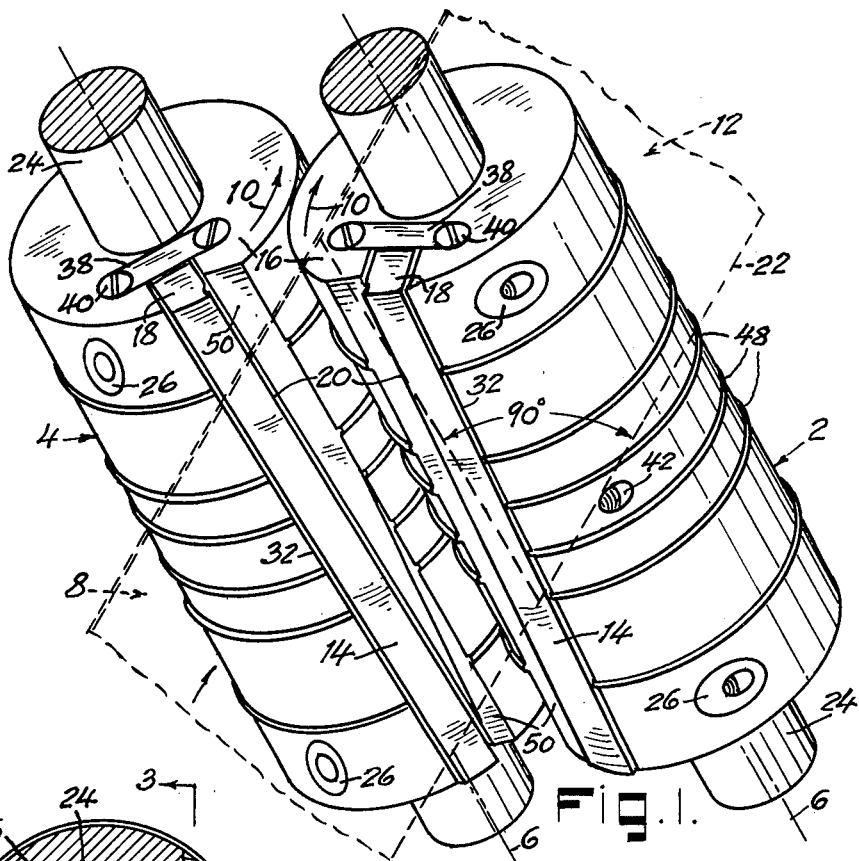
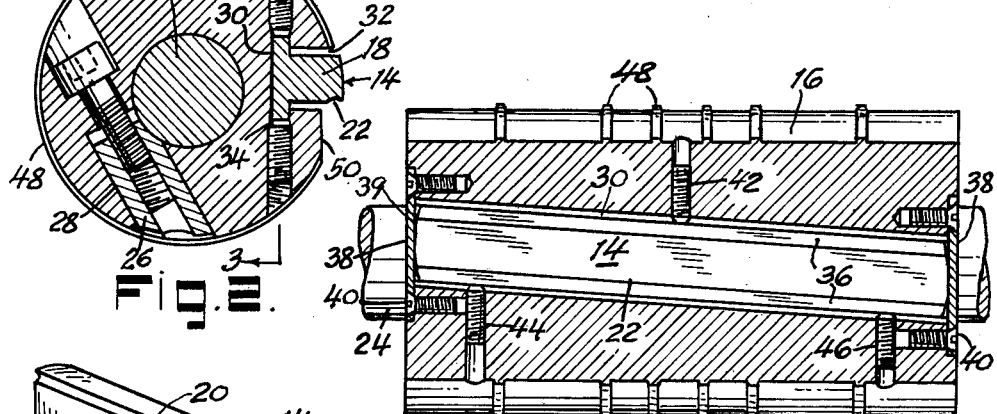
INVENTOR.
ALFRED A. LIICK
BY Albert Sperry.
ATTORNEY

United States Patent Office 3,230,809
Patented Jan. 25, 1966

3,230,809
COOPERATING ROTARY CUTTER BLADES WITH MEANS TO ADJUST ANGULAR TRAVERSE POSITION OF BLADES
Alfred A. Liick, 559 Howell Ave., Trenton, N.J.
Filed Nov. 13, 1963, Ser. No. 323,474
5 Claims. (Cl. 83—341)

This invention relates to rotary cutters adapted for use in severing a web or strip of material transversely to produce cards, sheets, or pieces having predetermined dimensions. The invention is of general application, but is of particular advantage in producing cards employed in data processing equipment such as the cards generally referred to as "IBM Cards."

Cards used in data processing systems are frequently handled at high speed and by automatic equipment, and it is, therefore, necessary that they be accurately formed and present smooth, clean edges which are positioned at right angles to each other. Thus, the length of each card must generally be maintained uniform within a few thousandths of an inch and the corners must present an angle of 90° within limits of a fraction of one degree.

In order to attain such accuracy in production and at the same time operate at high speed while forming cards or sheets having smooth, clean ends, it is desirable to sever the web of material transversely by means of a shearing or scissors-like action starting at one edge and progressing to the opposite edge of the web while the web of material continues to move past the cutting members. It is, therefore, necessary to provide rotary cutting elements with the proper lead angle and curvature to assure the necessary accuracy in operation. However, the blades of such cutting elements require sharpening from time to time even when they are made of such hard materials as tungsten carbide or the like. As a result, the blades not only must be adjusted and accurately positioned relative to each other and fixedly held in place when initially installed, but they must be further adjusted in position as wear takes place in the bearings or other elements of the equipment and each time one or more blades of the equipment are sharpened or ground.

In accordance with the present invention, the positioning and adjustment of the blades of rotary cutters employed in severing strips or webs of material transversely is simplified and rendered extremely accurate by providing a novel type of rotary blade holder, blade and adjusting means which are simple and economical to produce and use and which permit adjustment to assure the utmost accuracy in positioning and securing the cutting blades in place.

These results and advantages are preferably attained by providing a pair of blade holders rotatable about parallel axes and provided with blade receiving and adjusting means which positively prevent radial displacement of a blade with respect to the holder due to centrifugal force on high speed rotation of the holder and blade, and which further allow the blade to be maintained at a proper angle with respect to the axis of rotation to assure the desired accuracy in severing a web of material transversely.

Accordingly, the principal objects of the invention are to permit high speed operation of cutting means employed in severing a web or strip of material transversely while maintaining a high degree of accuracy in performing such operations; to provide a novel type of rotatable blade holder and blade which serves to retain the blade in fixed position relative to a blade holder; and to provide means for adjusting the position of a rotary cutter blade with respect to a holder and a cooperating cutter blade so as to afford the desired cutting action both initially and after the blade has become worn or been sharpened.

These and other objects and features of the present invention will appear from the following description thereof wherein reference is made to the figures of the accompanying drawings.

In the drawings:

FIG. 1 is a perspective illustrating typical cutting elements in which the present invention may be employed;

FIG. 2 is a transverse sectional view of a blade holder and blade of the type illustrated in FIG. 1;

FIG. 3 is a longitudinal sectional view of the holder and blade illustrated in FIG. 2 and taken on the line 3—3 thereof; and FIG. 4 is a perspective illustrating a preferred form of blade which may be used in the practice of the present invention.

In that form of the invention chosen for purposes of illustration in the drawings, the rotary cutters are shown at 2 and 4 and may be cutting elements embodied in any preferred type of equipment such as a "Carroll Press" used to produce "IBM Cards." Such cutting elements are rotatable about parallel axes indicated at 6 and are positioned on opposite sides of a web or strip of card forming material or the like as indicated at 8. The cutters are ordinarily rotated in opposite directions as indicated by the arrows 10 and the timing and speed of rotation are controlled in relation to the speed of travel of the web or strip of material 8 to produce a card, sheet or piece of material 12 of predetermined length. Knives 14 are carried by the holders 16 of the cutting elements 2 and 4 and are provided with blades 18 having cutting edges 20 which are brought into cooperative shearing relation for cutting the web 8 transversely and at right angles to the sides 22 of the web as the elements 2 and 4 rotate. The cutting elements illustrated each carry a single knife and, therefore, shear the web transversely upon each revolution thereof. However, if desired, the cutting elements may each carry two, three or more knives and be rotated at such speed as to produce a plurality of cards, pieces or sheets of material upon each revolution thereof.

The knife holder 16 illustrated in the drawings is in the form of a cylindrical body secured by suitable means to a shaft 24 rotatable about the axis 6. As shown in FIG. 2, the knife holder 16 may be secured to the shaft 24 by means of a locking wedge 26 threaded into a bore 28 extending through the knife holder 16 tangentially with respect to the shaft 24. A knife receiving recess 30 extends lengthwise of the holder 16 and is inclined at a suitable lead angle with respect to the axis 6 about which the holder rotates. The recess 30 illustrated is generally T-shaped in cross section although it may be otherwise formed to present a throat or longitudinal slot 32 which is narrower than the inner or base portion 34 of the recess. The knife 14 then may be T-shaped in cross section or otherwise formed with an enlarged head 36 so that the knife may be slipped endwise into the recess 30 while the blade portion 18 of the knife will project outward through the throat 32 of the recess to an active cutting position as shown. The enlarged head 36 of the knife thus cooperates with the walls of the base portion 34 of the knife receiving recess 30 so as to prevent outward movement of the knife under the action of centrifugal force even though the cutting element is rotated at high speed. Undesired endwise movement of the knife 14 within the recess 30 is prevented by means of end closure plates 38 secured to the ends of the holder 16 by screws 40 or the like.

Both the base portion 34 and the throat 32 of the knife receiving recess 30 are formed somewhat wider than the adjacent head 36 and projecting blade 18 of the knife. The knife, therefore, can be moved transversely within the recess 30 and with respect to the body of the holder 16 to assure the desired accurate positioning and lead angle of the blade with respect to the holder necessary to sever the web 8 in the correct position and along a line extending at 90° to the sides 22 of the web of material. For this purpose, means 42 are located substantially midway between the ends of the knife receiving recess 30 which may serve as an adjustable pivot for the knife 14, and other means 44 and 46 may be located near the opposite ends of the recess 30 for adjusting the angular inclination of the knife 14 within the recess. As shown, the means 42, 44 and 46 are in the form of adjusting screws which, in cooperation, serve to hold the knife 14 firmly in position within the recess in any selected or predetermined position necessary to produce the desired transverse cut in the web of material 8 engaged thereby. The adjusting screws obviously may be screwed in or out as may be required to displace and to tilt the knife 14 within the slot so as to effect the minute adjustments which may be required by differences in the thickness of the web of material 8 being cut, wear of bearings, knife edges, or other elements of the equipment or any other changes in operating conditions which may occur. The ends 39 of the cutter may be curved slightly as shown to permit such adjusting or tilting of the blade within the recess without cramping or wedging of the ends against the closure plates. In this way, adjustment of the blades can be effected readily while the rotary cutters are mounted in place.

Transverse displacement of the knife within the recess 30 which can be effected by adjustment of the central pivot or screw 42 engaged by the knife; and, if desired, the tilting or transverse adjustment of the blade can be effected as required by employing either of the end adjusting screws 44 or 46 as the pivot means and adjusting the other screws 42 and 46 or 42 and 44 for establishing and maintaining the desired and accurate position of the blade in the holder. Such operation may serve to effect the adjustment necessary when the knife blade is resharpened or changed in thickness or shape due to grinding of the blade for either initial or replacement use thereof.

The construction thus provided serves to position and hold the knife securely in place within the knife holder 16 whereby it may be rotated at high speed for producing the desired cards, sheets or pieces of material accurately and rapidly. The outer peripheral surface of the holder 16 may be provided with annular web supporting ribs 48 if desired, and the portion of the holder adjacent the cutting edge 20 of the knife may be relieved or cut away as indicated at 50 to present the cutting edge of the knife in a free position for engagement with the web of material being severed.

While the rotary cutters shown are preferably employed in pairs, as illustrated in FIG. 1, with the knives thereof inclined in opposite directions with respect to each other, a cutter embodying the present invention may be used in combination with a fixed or stationary cutter blade if desired. Moreover, the cutters of the present invention may be used in various types of equipment for cutting paper, cellophane, metal foil or any other material desired. Furthermore, the size or diameter of the knife holder may be substantially larger than illustrated in the drawings, and, as indicated above, the holder may carry a plurality of knives and be rotated at any desired speed and by any suitable means for use in various different types of equipment.

In view thereof, it should be understood that the particular embodiment of the invention illustrated in the drawings and described above is intended to be illustrative only and is not intended to limit the scope of the invention.

I claim:

1. A rotary cutter adapted for use in severing a web of material transversely comprising a knife holder rotatable about an axis, said holder having an elongated knife receiving recess therein extending lengthwise of the holder and inclined with respect to the axis of rotation of the holder, an elongated knife blade positioned in said recess and of less width than said recess, pivot means within said recess positioned substantially midway of the length of said recess and engaging said knife blade near the central portion thereof, and adjusting means located on opposite sides of said pivot means and within said recess, said adjusting means engaging said knife blade and variable to alter the angular position of said knife blade transversely within said recess and with respect to the axis of rotation of said holder.

2. A rotary cutter as defined in claim 1 wherein the base of the knife receiving recess has an enlarged base portion and a relatively narrow slot opening in the periphery of the holder, and said knife is provided with a head located in said recess and of greater width than said slot whereby the knife is held against radial movement within said slot.

3. A rotary cutter as defined in claim 2 wherein the pivot means and adjusting means engage the head of the knife.

4. A rotary cutter as defined in claim 2 wherein the knife receiving recess is open at at least one end of the holder and the knife is slidable lengthwise of the recess through the open end of the recess to position the head of the knife within said recess.

5. Means for severing a web of material transversely comprising a pair of cutter members mounted for rotation in opposite directions about parallel axes, each of said cutter members having a knife holder provided with a knife receiving recess extending lengthwise of the holder and inclined with respect to the axis of rotation of the holder, the inclination of the recesses in said knife holders being opposite with respect to each other, the knife receiving recesses in said holders extending to at least one end of the holder and having enlarged base portions, knives in said holders provided with enlarged heads slidable longitudinally into and out of said recesses and held against radial displacement with respect to the holders by the enlarged heads of the knives, the heads of the knives being of less width than the bases of said recesses, pivot means in said recesses engageable with the heads of said knives midway of the length of said recesses, and adjusting means engageable with the knives on opposite sides of said pivot means and near the ends of the knives for varying the angular positions of said knives with respect to said holders and their axes of rotation.

References Cited by the Examiner

UNITED STATES PATENTS

| | | | |
|---|---|---|---|
| 1,006,783 | 10/1911 | Paquin | 83—341 |
| 2,478,240 | 8/1949 | Christman | 83—341 |

ANDREW R. JUHASZ, *Primary Examiner.*